United States Patent
Nakai et al.

(10) Patent No.: US 9,336,595 B2
(45) Date of Patent: May 10, 2016

(54) CALIBRATION DEVICE, METHOD FOR IMPLEMENTING CALIBRATION, AND CAMERA FOR MOVABLE BODY AND STORAGE MEDIUM WITH CALIBRATION FUNCTION

(71) Applicant: Panasonic Intellectual Property Management Co., Ltd., Osaka (JP)

(72) Inventors: Wataru Nakai, Tokyo (JP); Koji Arata, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 16 days.

(21) Appl. No.: 14/565,941

(22) Filed: Dec. 10, 2014

(65) Prior Publication Data

US 2015/0178922 A1 Jun. 25, 2015

(30) Foreign Application Priority Data

Dec. 20, 2013 (JP) .................. 2013-263698

(51) Int. Cl.
*H04N 17/00* (2006.01)
*G06T 7/00* (2006.01)

(52) U.S. Cl.
CPC ............ *G06T 7/0018* (2013.01); *H04N 17/002* (2013.01); *G06T 2207/30252* (2013.01)

(58) Field of Classification Search
CPC .... H04N 17/002; H04N 17/00; G06T 7/0018; G06T 7/002; G06T 2207/30252

USPC ............ 348/187, 180, 135, 142, 148; 702/85, 702/94, 95
IPC ...................................................... H04N 17/00
See application file for complete search history.

(56) References Cited

U.S. PATENT DOCUMENTS

| 6,192,145 | B1 | 2/2001 | Anandan et al. |
| 2008/0007619 | A1 | 1/2008 | Shima et al. |
| 2010/0061701 | A1* | 3/2010 | Iwane ................... G06T 3/0062 386/241 |

(Continued)

FOREIGN PATENT DOCUMENTS

| JP | 2008-011174 | 1/2008 |
| WO | 2009/142921 | 11/2009 |
| WO | 2010/146695 | 12/2010 |

OTHER PUBLICATIONS

Ling-Ling Wang et al., "Camera Calibration by Vanishing Lines for 3D Computer Vision" IEEE Transactions on Pattern Analysis and Machinen Intelligence vol. 13,No. 4 Apr. 1991, pp. 370-376.
The Extended European Search Report dated May 4, 2015 for the related European Patent Application No. 14196761.2.
Darius Burschka et al: "Direct Pose Estimation with a Monocular Camera", Feb. 18, 2008, Robot Vision; [Lecture Notes in Computer Science], Springer Berlin Heidelberg, Berlin, Heidelberg, pp. 440-453, XP019086932.

(Continued)

*Primary Examiner* — Sherrie Hsia
(74) *Attorney, Agent, or Firm* — Greenblum & Bernstein, P.L.C.

(57) ABSTRACT

A calibration device capable of calculating an installation parameter of a camera without storing graphical features of road marking in advance or without requiring another technique. An acquiring unit acquires images captured by the camera before and after a vehicle moves, and an extracting unit extracts two feature points from each of the images captured before and after the vehicle moves. A calculating unit calculates a camera installation parameter on the basis of a positional relationship of coordinates of the two feature points in the image before the vehicle moves and coordinates of the two feature points after the vehicle moves that correspond to the feature points before the vehicle moves.

9 Claims, 14 Drawing Sheets

(56) References Cited

U.S. PATENT DOCUMENTS

| | | | |
|---|---|---|---|
| 2011/0175998 A1* | 7/2011 | Azuma | G06T 7/2033 348/135 |
| 2012/0081512 A1 | 4/2012 | Shimizu | |
| 2012/0236119 A1* | 9/2012 | Rhee | G01S 3/7864 348/46 |

OTHER PUBLICATIONS

Kaess M et al: "Flow separation for fast and robust stereo odometry", 2009 IEEE International Conference on Robotics and Automation : (ICRA) ; Kobe, Japan, May 12-17, 2009, IEEE, Piscataway, NJ, USA, May 12, 2009, pp. 3539-3544, XP031509567.

* cited by examiner

DEEP VANISHING POINT

VANISHING POINT

DEEP VANISHING POINT

VANISHING LINE

X-AXIS

VANISHING POINT

Y-AXIS

CALIBRATION DEVICE, METHOD FOR IMPLEMENTING CALIBRATION, AND CAMERA FOR MOVABLE BODY AND STORAGE MEDIUM WITH CALIBRATION FUNCTION

BACKGROUND

1. Technical Field

This disclosure relates to a calibration technique for calculating installation parameters of a camera on the basis of images captured by the camera installed on a movable body.

2. Description of the Related Art

In recent years, a technique has been spread where a camera installed on a vehicle is used to measure distances between the vehicle and objects in front of or to the rear of the vehicle and, when needed, the driver is alerted by an alarm. In order to accurately measure the distance between the vehicle and the object, it is necessary to calculate (calibrate) an installation position and an installation angle of a camera with respect to the vehicle.

In general, as a calibration technique for calculating an installation angle of a camera with respect to the vehicle, a technique utilizing a point (a vanishing point) at which straight lines which are parallel in real space intersect with each other in image space is known.

In a calibration technique utilizing a vanishing point, the installation angle of the camera is calculated using at least two vanishing points: a vanishing point (a deep vanishing point) which is calculated using lines parallel to a travelling direction of the vehicle and a vanishing point which is calculated using other lines parallel to another direction.

In the following description, the installation angle of the camera with respect to the vehicle is referred to as an installation parameter of the camera.

With regard to a calibration technique utilizing a vanishing point to calculate an installation parameter of the camera, there is a technique where two pairs of parallel lines are extracted using a road marking of which graphical features are stored in advance, and then two vanishing points are calculated from the extracted two pairs of parallel lines (see, for example, Japanese Unexamined Patent Application Publication No. 2008-11174). In addition, there is also a technique where a plurality of images are successively captured and accumulated, then an edge is extracted from the accumulated image, whereby a set of lines parallel to the travelling direction of a vehicle is extracted and a deep vanishing point is calculated using the extracted parallel lines (see, for example, International Publication No. 2010/146695).

In the technique described in the above-mentioned Japanese Unexamined Patent Application Publication No. 2008-11174, in order to calculate the vanishing point, graphical features of the road marking need to be stored in advance. Further, if a vehicle does not encounter a road marking which coincides with any of the road markings of which features are stored, it would be impossible to calculate an installation parameter of a camera.

In addition, in the technique described in International Publication No. 2010/146695, although a deep vanishing point can be calculated, another vanishing point cannot be calculated; therefore, an installation parameter of a camera cannot be calculated with the technique described in International Publication No. 2010/146695 alone.

SUMMARY

Thus, a non-limiting exemplary embodiment of the present disclosure provides a calibration device, a method for implementing calibration, and a camera for a movable body and a storage medium with a calibration function which are capable of calculating an installation parameter of the camera without storing graphical features of road markings in advance or without requiring another technique.

A calibration device of this disclosure is a calibration device for calculating an installation parameter of a camera installed on a movable body. The calibration device includes an acquiring unit that acquires an image captured by the camera; an extracting unit that extracts a first point and a second point, which are on a motion plane of the movable body or on a plane parallel to the motion plane and which are located in a manner such that a straight line connecting the first point and the second point is not parallel to a moving direction of the movable body, from the captured image including the first point and the second point through an image process; and a calculating unit that calculates the installation parameter of the camera on the basis of a positional relationship between a first coordinate of the first point extracted by the extracting unit from a first image that is captured at a first timing and a second coordinate of the second point extracted by the extracting unit from the first image, a positional relationship between a third coordinate of the first point extracted by the extracting unit from a second image that is captured at a second timing after the movable body moves in the moving direction after the first timing and a fourth coordinate of the second point extracted by the extracting unit from the second image, a positional relationship between the first coordinate and the third coordinate, and a positional relationship between the second coordinate and the fourth coordinate.

It should be noted that general or specific embodiments may be realized as a system, a method, an integrated circuit, a computer program, storage media, or any elective combination thereof.

According to the present disclosure, an installation parameter of a camera can be calculated without storing graphical features of road markings in advance or without requiring another technique.

DETAILED DESCRIPTION

Hereinafter, Embodiments of this disclosure will be described with reference to the drawings. Note that although a vehicle is given as an example of a movable body in the Embodiments of this disclosure, the movable body is not limited to a vehicle.

Embodiment 1

Hereinafter, a calibration device according to Embodiment 1 of this disclosure will be described.

Figure 1:
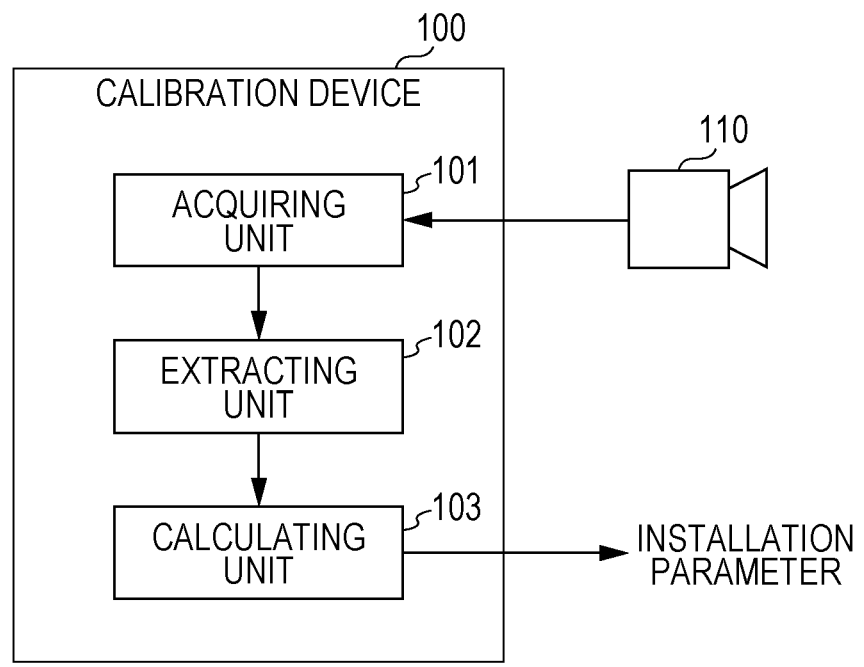
FIG. 1 is a block diagram illustrating a configuration example of a calibration device according to Embodiment 1 of this disclosure.

FIG. 1 is a block diagram illustrating a configuration example of the calibration device according to Embodiment 1 of this disclosure.

In FIG. 1, a calibration device 100 includes an acquiring unit 101 which acquires an image captured by a camera 110 installed on a vehicle, an extracting unit 102 which extracts a point through an image process from the image acquired by the acquiring unit 101, and the calculating unit 103 which calculates an installation parameter of a camera using coordinates of the point extracted by the extracting unit 102.

Figure 2:
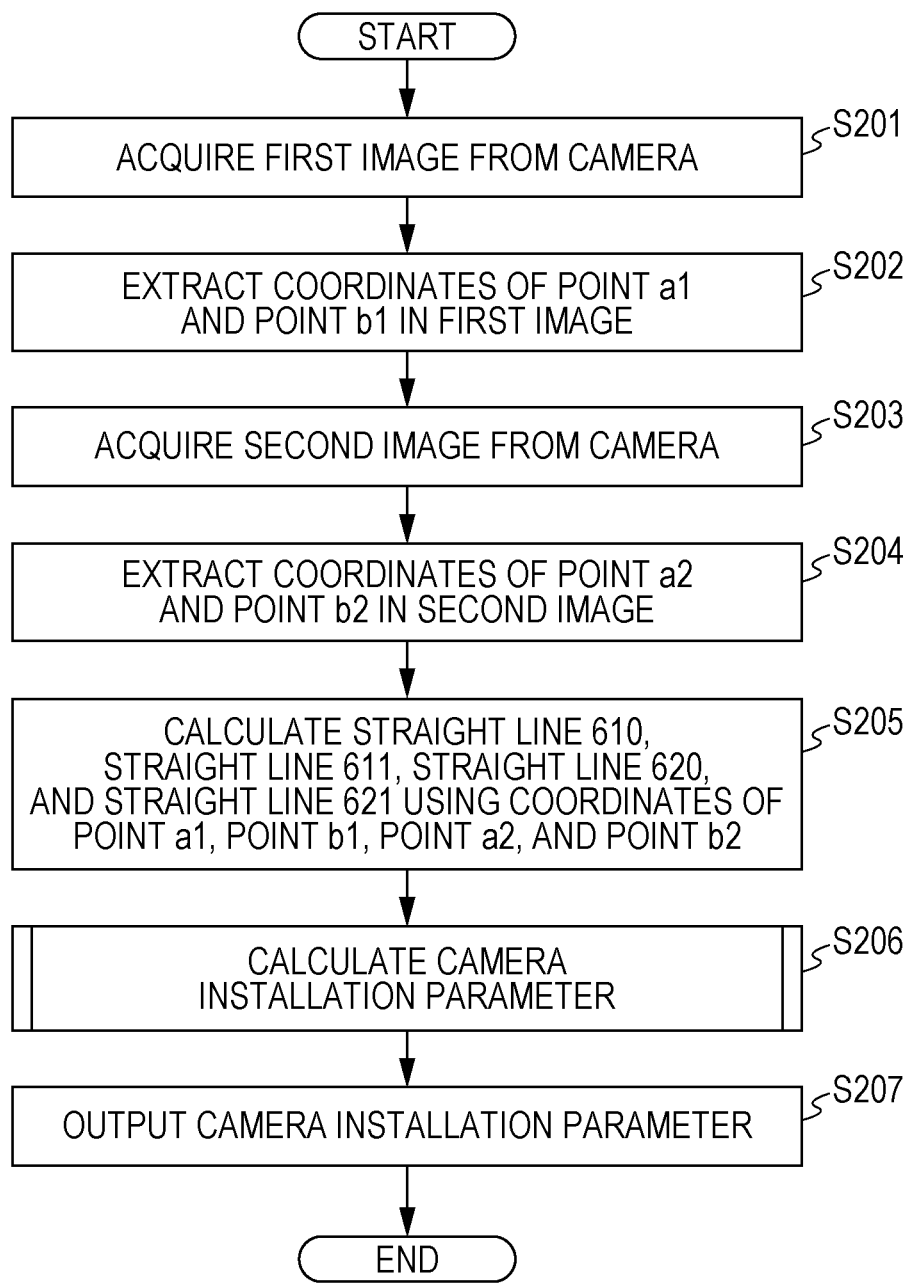
FIG. 2 is a flowchart illustrating an operation example of the calibration device according to Embodiment 1 of this disclosure.
Figure 3:
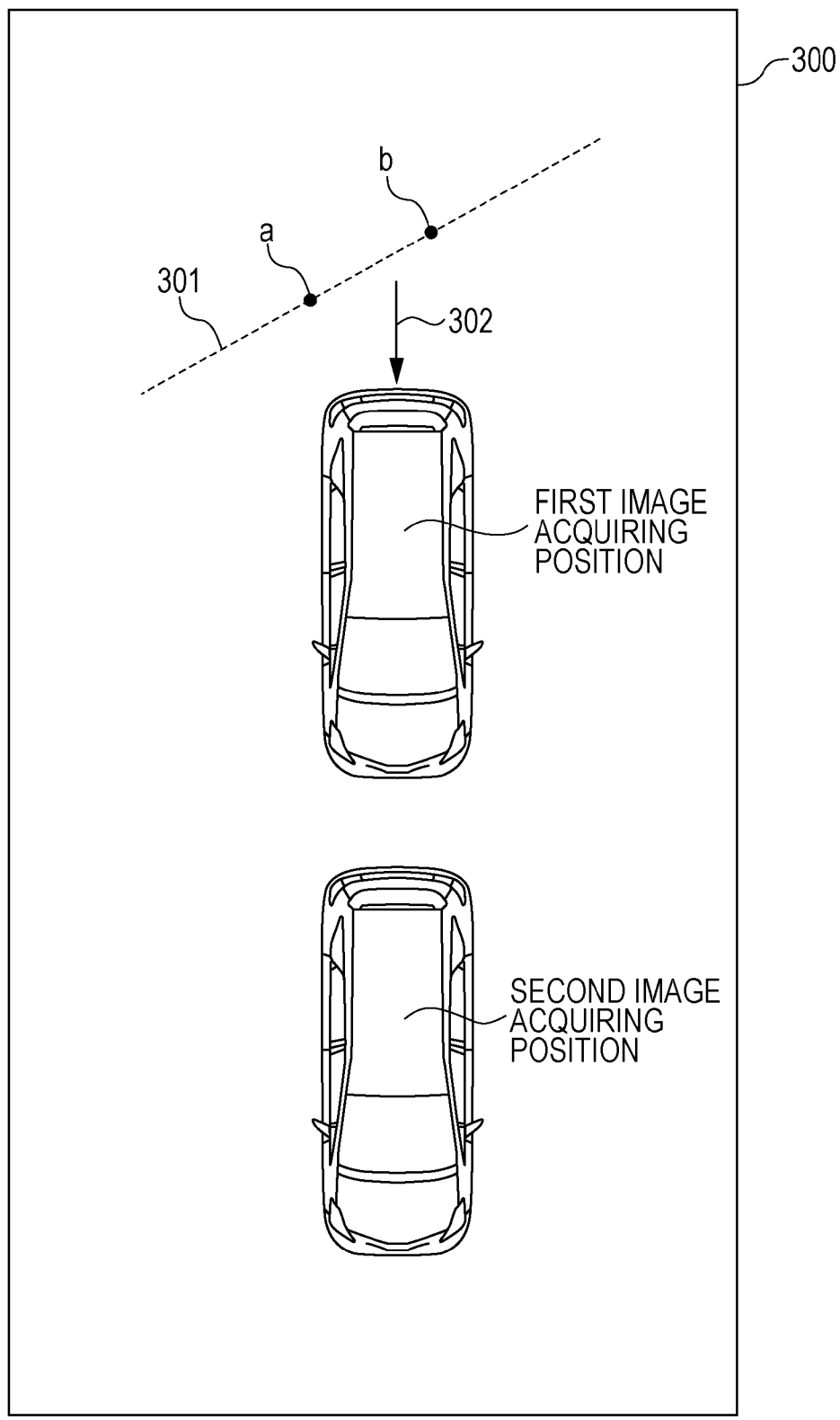
FIG. 3 is an explanatory diagram illustrating a situation where the calibration device according to Embodiment 1 of this disclosure acquires an image from a camera.

FIG. 2 is a flowchart illustrating an operation of the calibration device 100. FIG. 3 is an explanatory diagram illustrating a situation where the acquiring unit 101 in the calibration device 100 acquires an image from the camera 110.

In FIG. 3, a first point a and a second point b are on a motion plane 300. A straight line 301 which connects the two points is not parallel to a moving direction 302 of a vehicle. Here, the term "motion plane" refers to a flat plane on which a vehicle travels. The motion plane may be inclined from the horizontal.

The acquiring unit 101 acquires an image captured by the camera 110 from the camera 110, in accordance with an externally provided image acquiring signal (not illustrated). In Embodiment 1, an image acquiring signal is input to the acquiring unit 101 at a first image acquiring position illustrated in FIG. 3. The acquiring unit 101 acquires an image (a first image), which is an image including the first point a and the second point b captured by the camera 110 at the first image acquiring position (Step S201).

Figure 4:
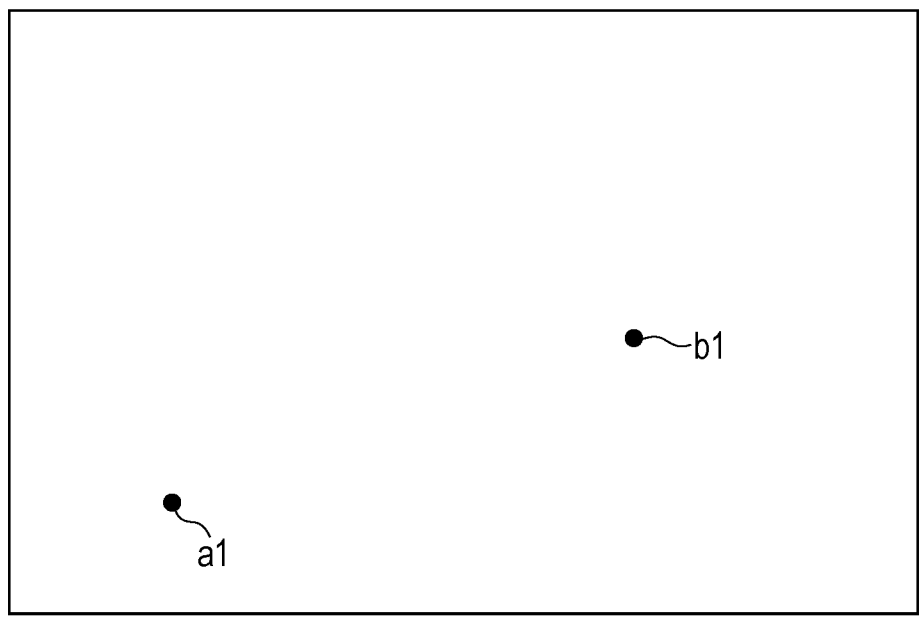
FIG. 4 illustrates a first image which is captured at a first timing according to Embodiment 1 of this disclosure.

FIG. 4 is an explanatory diagram of the first image acquired by the acquiring unit 101 in the Step S201. In FIG. 4, a point a1 corresponds to the first point a in FIG. 3 and a point b1 corresponds to the second point b in FIG. 3.

The image acquired by the acquiring unit 101 is input to the extracting unit 102. The extracting unit 102 extracts the first point a and the second point b from the input image through an image process, such as a comparison of pixel brightness in the image. In other words, the extracting unit 102 calculates coordinates of the first point a (first coordinates) and coordinates of the second point b (second coordinates) in the first image (Step S202).

Then, after the vehicle moves straight forward, at a second image acquiring position illustrated in FIG. 3, the image acquiring signal is input to the acquiring unit 101 and the acquiring unit 101 acquires an image (a second image), which is an image including the first point a and the second point b captured by the camera 110 at the second image acquiring position (Step S203).

Figure 5:
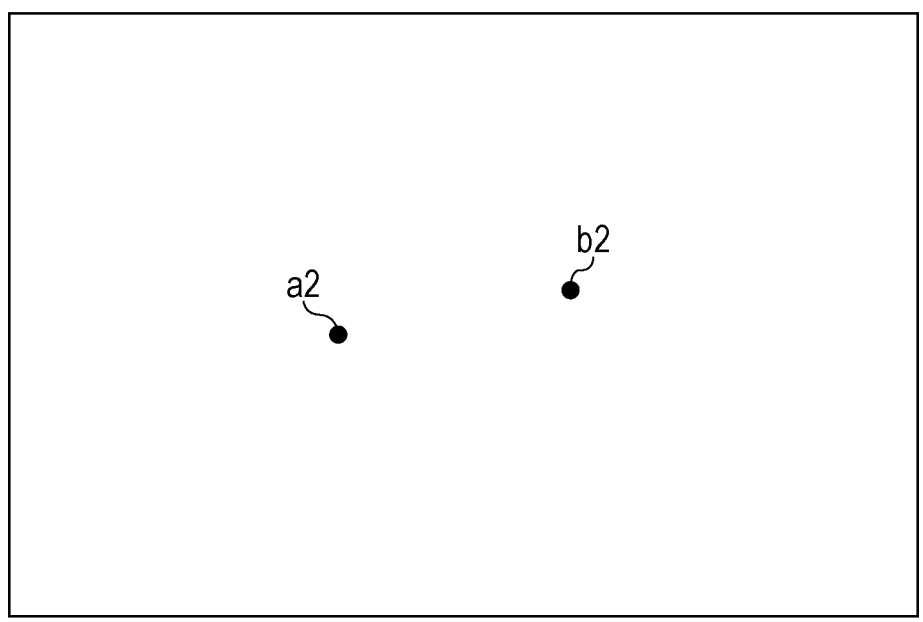
FIG. 5 illustrates a second image which is captured at a second timing according to Embodiment 1 of this disclosure.

FIG. 5 is an explanatory diagram of the second image acquired by the acquiring unit 101 in the Step S203. In FIG. 5, a point a2 corresponds to the first point a in FIG. 3 and a point b2 corresponds to the second point b in FIG. 3.

The image acquired by the acquiring unit 101 is input to the extracting unit 102. The extracting unit 102 performs a similar process to that in the Step S202 and calculates coordinates of the first point a (third coordinates) and coordinates of the second point b (fourth coordinates) in the second image (Step S204).

The coordinates of the first point a (the coordinates of the point a1 in FIG. 4) and the coordinates of the second point b (the coordinates of the point b1 in FIG. 4), which are extracted in the Step S202, and the coordinates of the first point a (the coordinates of the point a2 in FIG. 5) and the coordinates of the second point b (the coordinates of the point b2 in FIG. 5), which are extracted in the Step S204, are input to the calculating unit 103.

The calculating unit 103 calculates an installation parameter of a camera on the basis of a positional relationship between the coordinates of the point a1 and the coordinates of the point b1, a positional relationship between the coordinates of the point a2 and the coordinates of the point b2, a positional relationship between the coordinates of the point a1 and the coordinates of the point a2, and a positional relationship between the coordinates of the point b1 and the coordinates of the point b2.

Figure 6:
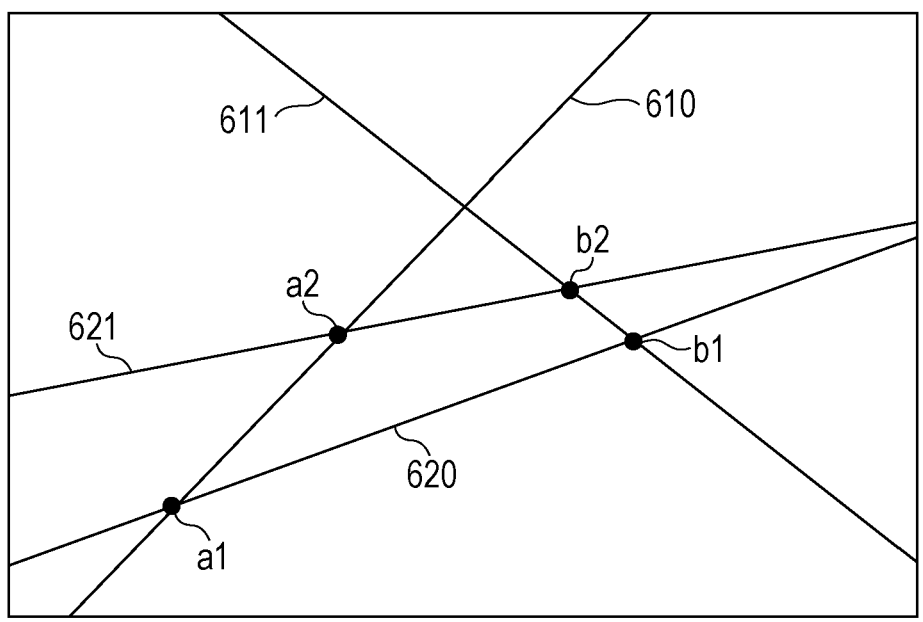
FIG. 6 is a conceptual diagram illustrating an operation of a calculating unit 103 according to Embodiment 1 of this disclosure.

The calculating unit 103 calculates straight lines from the coordinates of the point a1, the point b1, the point a2, and the point b2 which are extracted by the extracting unit 102. In FIG. 6, the point a1, the point b1, the point a2, and the point b2, which are extracted by the extracting unit 102, are illustrated in one image as an example. FIG. 6 is a diagram for illustrating a process of the calculating unit 103. The calculating unit 103 calculates a straight line 610 which passes through the coordinates of the point a1 and the point a2, a straight line 611 which passes through the coordinates of the point b1 and the point b2, a straight line 620 which passes through the coordinates of the point a1 and the point b1, and a straight line 621 which passes through the coordinates of the point a2 and the point b2 (Step S205).

The calculating unit 103 calculates an installation parameter of a camera on the basis of the positional relationships of the straight line 610, the straight line 611, the straight line 620, and the straight line 621 (the Step S206) and outputs a calculation result (Step S207).

Figure 7:
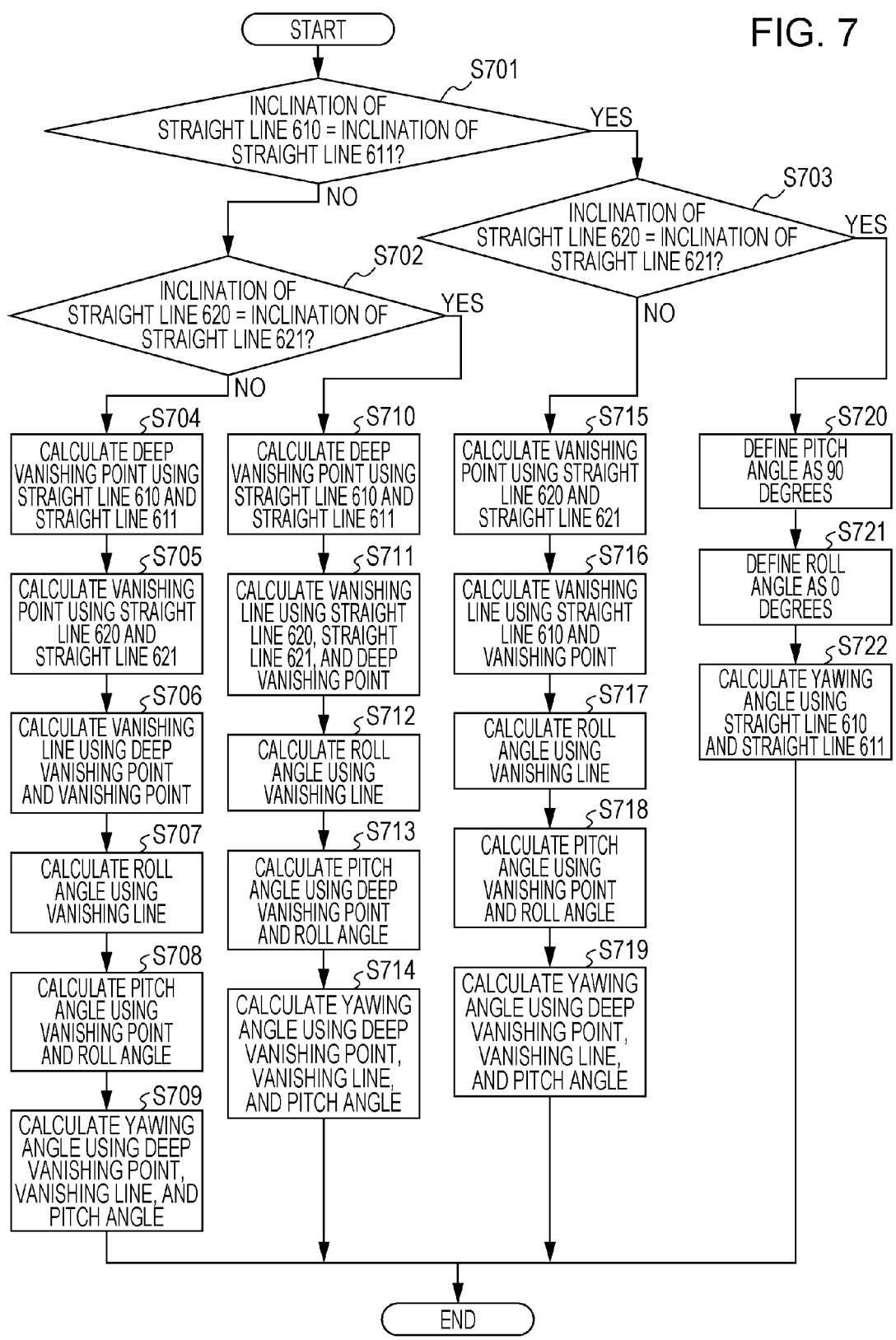
FIG. 7 is a flowchart illustrating a detailed operation example of a camera installation parameter calculating process of Step S206 according to Embodiment 1 of this disclosure.

FIG. 7 is a flowchart illustrating a detailed operation of a camera installation parameter calculating process in the Step S206.

The calculating unit 103 compares the inclination of the straight line 610 with that of the straight line 611 (Step S701) and the inclination of the straight line 620 with that of the straight line 621 (Step S702 or Step S703), and then the camera installation parameter calculating process is executed on the basis of the positional relationships of the straight lines.

Described hereinafter are examples of the camera installation parameter calculating process depending on whether the inclination of the straight line 610 is equal to or not equal to the inclination of the straight line 611 and whether the inclination of the straight line 620 is equal to or not equal to the inclination of the straight line 621.

(1) A case where the inclination of the straight line 610 is not equal to the inclination of the straight line 611 and the inclination of the straight line 620 is not equal to the inclination of the straight line 621 (Step S704 to Step S709)

Figure 8:
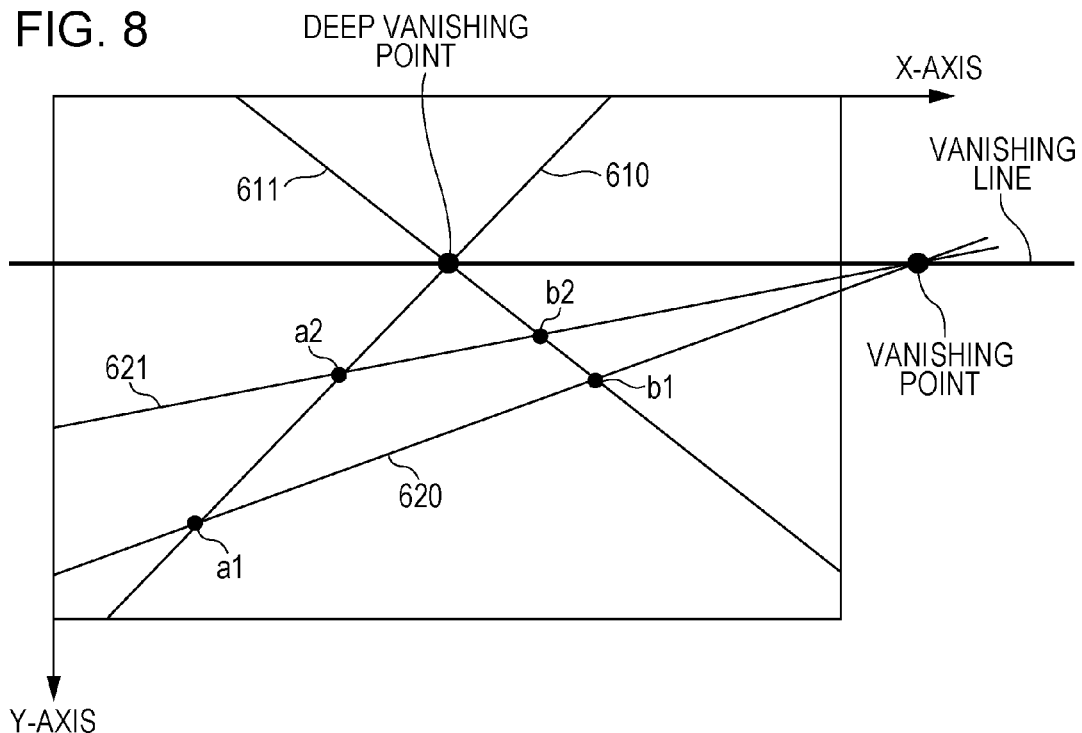
FIG. 8 is a first explanatory diagram illustrating a process of the calculating unit 103 according to Embodiment 1 of this disclosure.

An example of the positional relationship of the point a1, the point b1, the point a2, and the point b2 is illustrated in FIG. 8. The calculating unit 103 calculates an intersection of the straight line 610 and the straight line 611 as a deep vanishing point (the Step S704). In addition, the calculating unit 103 calculates an intersection of the straight line 620 and the straight line 621 as a vanishing point (the Step S705). Then, the calculating unit 103 calculates a straight line which passes through the deep vanishing point and the vanishing point as a vanishing line (the Step S706).

Details of a method for calculating a parameter of a camera using a vanishing point and a vanishing line are described in publications (such as Ling-Ling Wang, "Camera Calibration by Vanishing Lines for 3D Computer Vision", IEEE Transactions on Pattern Analysis and Machine Intelligence, Vol. 13, No. 4, April 1991, pp 370-376).

Although no detailed description is given here, the calculating unit 103 calculates a camera installation parameter using a focal length of the camera 110 on the basis of the positional relationship between the coordinates of the point a1 and the coordinates of the point b1, the positional relationship between the coordinates of the point a2 and the coordinates of the point b2, the positional relationship between the coordinates of the point a1 and the coordinates of the point a2, and the positional relationship between the coordinates of the point b1 and the coordinates of the point b2.

In this Embodiment, definitions of the camera installation parameter are as follows: the term "roll angle" refers to a rotation angle whose axis is an optical axis of the camera, the term "pitch angle" refers to a rotation angle whose axis is parallel to the motion plane and perpendicular to the optical axis of the camera, and the term "yawing angle" refers to a rotation angle whose axis is perpendicular to the motion plane.

Further, in the coordinate system of the image space, the original point is in the upper left, the X-axis extends rightward and the Y-axis extends downward.

The calculating unit 103 calculates an angle between a straight line parallel to the X-axis and the vanishing line calculated in the Step S706 as the roll angle (the Step S707). Then, the calculating unit 103 calculates the pitch angle using the focal length of the camera 110, the coordinates of the vanishing point calculated in the Step S705, and the roll angle calculated in the Step S707 (the Step S708). Finally, the calculating unit 103 calculates the yawing angle using the focal length of the camera 110, the coordinates of the deep vanishing point calculated in the Step S704, the vanishing line calculated in the Step S706, and the pitch angle calculated in the Step S708 (the Step S709).

As described above, in a case where the inclination of the straight line 610 is different from that of the straight line 611 and the inclination of the straight line 620 is different from that of the straight line 621, the calibration device according to Embodiment 1 of this disclosure can obtain the deep vanishing point and the vanishing point at the same time and then calculate the camera installation parameter using the vanishing line which passes through the deep vanishing point and the vanishing point.

(2) A case where the inclination of the straight line 610 is not equal to the inclination of the straight line 611 and the inclination of the straight line 620 is equal to the inclination of the straight line 621 (Step S710 to Step S714)

Figure 9:
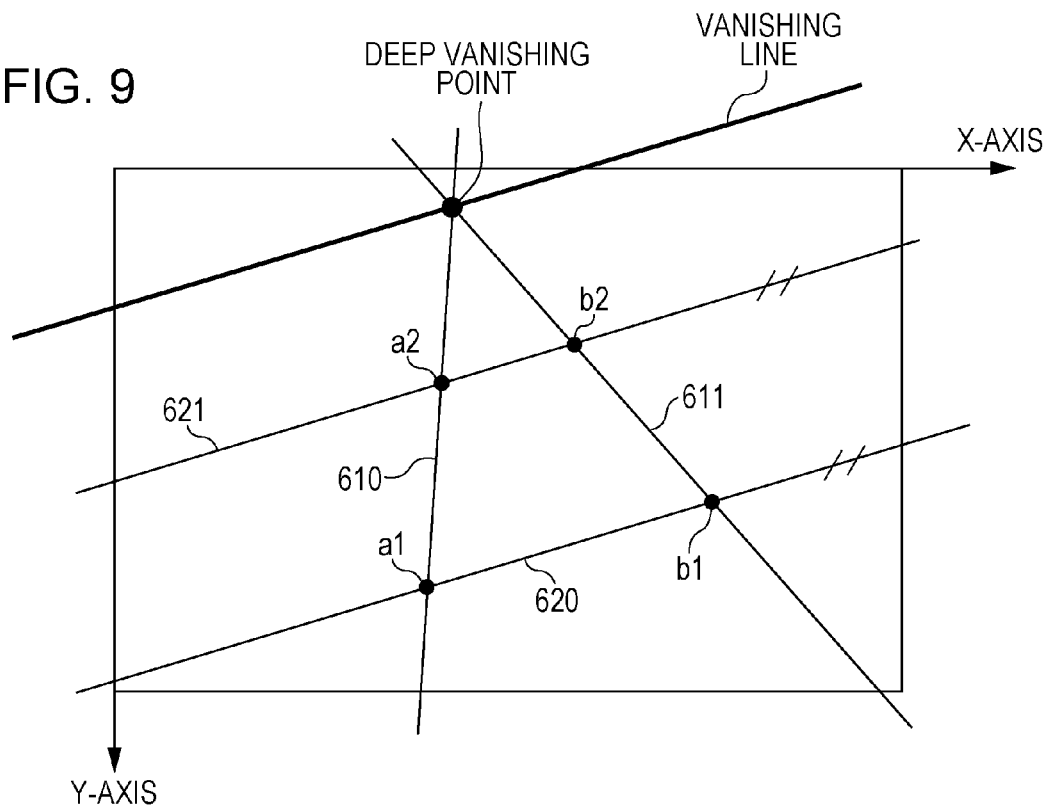
FIG. 9 is a second explanatory diagram illustrating the process of the calculating unit 103 according to Embodiment 1 of this disclosure.

An example of the positional relationship of the point a1, the point b1, the point a2, and the point b2 is illustrated in FIG. 9. The calculating unit 103 calculates an intersection of the straight line 610 and the straight line 611 as a deep vanishing point (the Step S710). Then, the calculating unit 103 calculates a straight line which passes through the deep vanishing point and is parallel to the straight line 620 and the straight line 621 as a vanishing line (the Step S711).

The calculating unit 103 calculates an angle between a straight line parallel to the X-axis and the vanishing line calculated in the Step S711 as the roll angle (the Step S712). Then, the calculating unit 103 calculates the pitch angle using the focal length of the camera 110, the coordinates of the deep vanishing point calculated in the Step S710, and the roll angle calculated in the Step S712 (the Step S713). Finally, the calculating unit 103 calculates the yawing angle using the focal length of the camera 110, the coordinates of the deep vanishing point calculated in the Step S710, the vanishing line calculated in the Step S711, and the pitch angle calculated in the Step S713 (the Step S714).

(3) A case where the inclination of the straight line 610 is equal to the inclination of the straight line 611 and the inclination of the straight line 620 is not equal to the inclination of the straight line 621 (Step S715 to Step S719)

Figure 10:
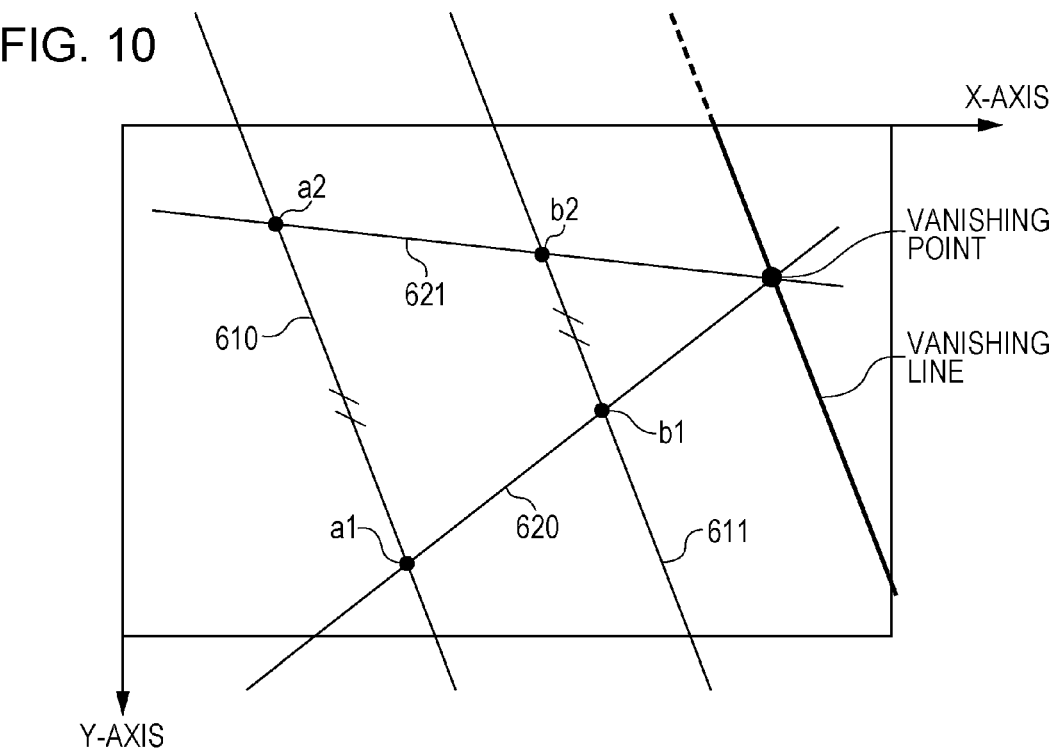
FIG. 10 is a third explanatory diagram illustrating the process of the calculating unit 103 according to Embodiment 1 of this disclosure.

An example of the positional relationship of the point a1, the point b1, the point a2, and the point b2 is illustrated in FIG. 10. The calculating unit 103 calculates an intersection of the straight line 620 and the straight line 621 as a vanishing point (the Step S715). Then, the calculating unit 103 calculates a straight line which passes through the vanishing point and is parallel to the straight line 610 and the straight line 611 as a vanishing line (the Step S716).

The calculating unit 103 calculates an angle between a straight line parallel to the X-axis and the vanishing line calculated in the Step S716 as the roll angle (the Step S717). Then, the calculating unit 103 calculates the pitch angle using the focal length of the camera 110, the coordinates of the vanishing point calculated in the Step S715, and the roll angle calculated in the Step S717 (the Step S718).

Finally, the calculating unit 103 calculates the yawing angle using the focal length of the camera 110, the coordinates of a deep vanishing point which is defined to lie at an infinite distance along the vanishing line calculated in the Step S716 in the direction from the point a1 toward the point a2, the vanishing line calculated in the Step S716, and the pitch angle calculated in the Step S718 (the Step S719).

(4) A case where the inclination of the straight line 610 is equal to the inclination of the straight line 611 and the inclination of the straight line 620 is equal to the inclination of the straight line 621 (Step S720 to Step S722)

Figure 11:
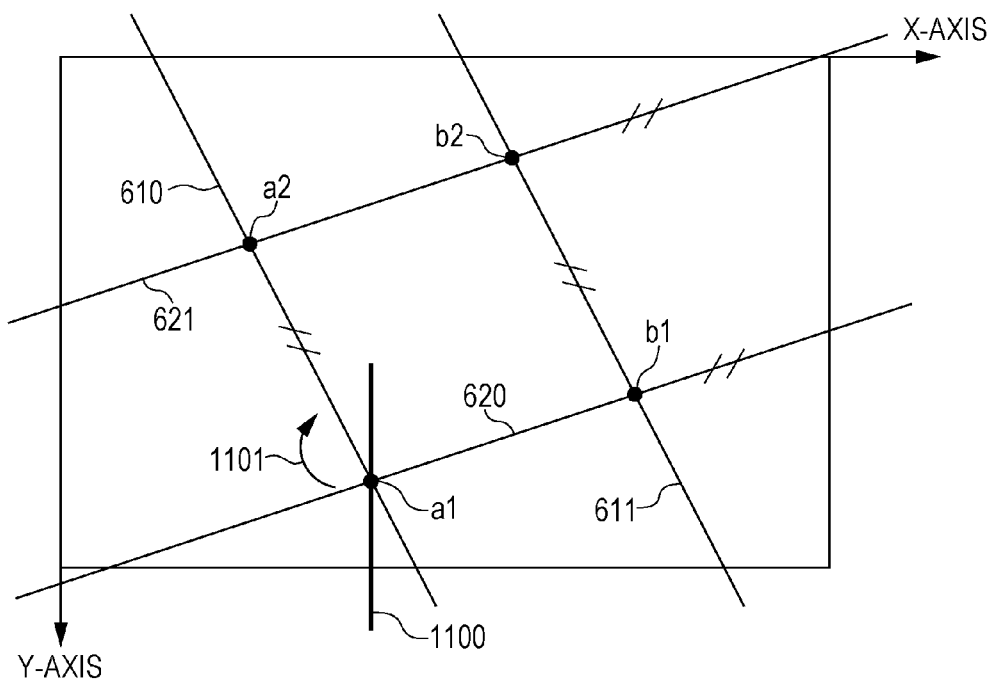
FIG. 11 is a fourth explanatory diagram illustrating the process of the calculating unit 103 according to Embodiment 1 of this disclosure.

An example of the positional relationship of the point a1, the point b1, the point a2, and the point b2 is illustrated in FIG. 11.

When the inclination of the straight line 610 is equal to that of the straight line 611 and the inclination of the straight line 620 is equal to that of the straight line 621, the camera is installed in a manner such that the optical axis thereof is perpendicular to the motion plane; therefore, the calculating unit 103 defines the pitch angle as 90 degrees (the Step S720). Further, when the pitch angle is 90 degrees, it is impossible to distinguish changes in the roll angle from changes in the yawing angle; therefore, the roll angle is defined as 0 degrees in this case (the Step S721).

The calculating unit 103 calculates an angle 1101 formed by a straight line 1100 parallel to the Y-axis, the straight line 610, and the straight line 611, as the yawing angle (the Step S722).

Note that the method for calculating an installation parameter of a camera which has been described above is an example, and another method may be employed to calculate the installation parameter of a camera using the coordinates of the points.

In addition, although the two points on the motion plane are used in the above description, two points on another plane parallel to the motion plane, such as tops of poles having the same height, may be similarly used to obtain the camera installation parameter.

The calibration device according to Embodiment 1 of this disclosure may be realized by using dedicated hardware. Alternatively, the calibration device may be realized by storing a program which executes the function in a computer-readable recording medium and making a computer read and execute the program.

Further, such a storage medium may be mounted on the camera 110 to provide a camera having a calibration function.

The first point a and the second point b on the motion plane 300 may be markers having a specific shape and color to enhance the process accuracy of the extracting unit 102.

The distance between the first image acquiring position and the second image acquiring position is not particularly limited, as long as both the first point a and the second point b are captured in each of the first image and the second image. For example, the distance may be 50 cm or 10 m.

Note that although the movable body moves in a straight line on a level plane in this embodiment, a perfectly straight trajectory is not essential for this disclosure. The calculation accuracy of the camera installation parameter depends on the degree of straightness and levelness. Therefore, the degree of straightness and levelness is not limited, as long as the calculation accuracy of the camera installation parameter reaches a certain degree required by an application or the like; for example, the movable body may zigzag or move over an uneven or curved surface.

When the camera is in a datum position, a straight line which passes through two feature points on an image captured before the vehicle moves straight and a straight line which passes through two feature points on an image captured after the vehicle moves straight, which correspond to the two points before the vehicle moves straight, are parallel to each other in the real space. In addition, a straight line which passes through one of the two feature points before the vehicle moves straight and the corresponding feature point after the vehicle moves straight are also parallel to a straight line which passes through another of the two feature points before the vehicle moves straight and the corresponding feature point after the vehicle moves straight in the real space. Using the images including the two feature points which define the two pairs of parallel lines in the real space, the installation parameter of a camera can be calculated.

Accordingly, as described above, the installation parameter of a camera can be calculated using the calibration device according to Embodiment 1 of this disclosure, without storing graphical features of road markings or the like in advance or without using another technique.

Embodiment 2

Hereinafter, a calibration device according to Embodiment 2 of this disclosure will be described.

Figure 12:
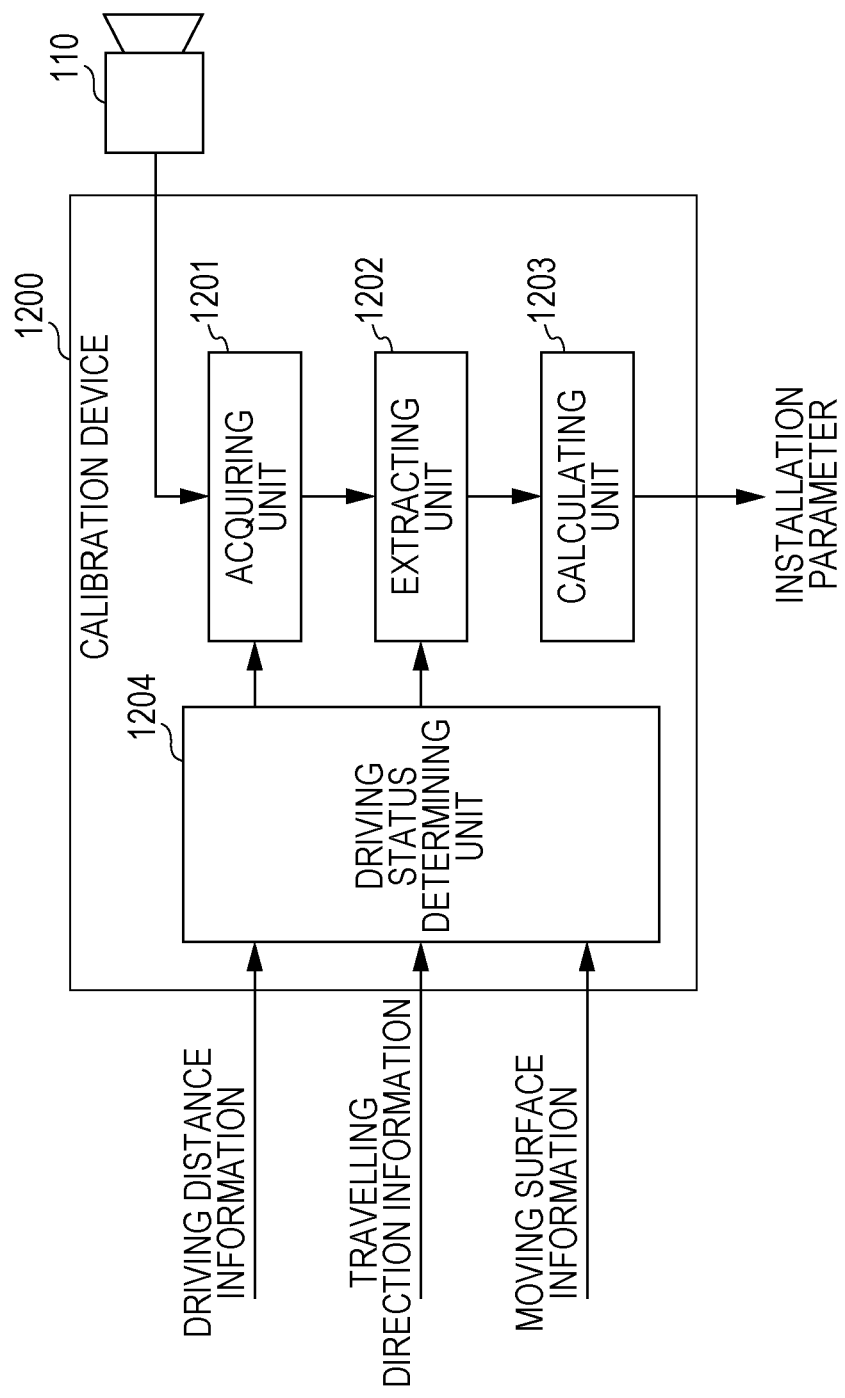
FIG. 12 is a block diagram illustrating a configuration example of a calibration device according to Embodiment 2 of this disclosure.

FIG. 12 is a block diagram illustrating a configuration example of the calibration device according to Embodiment 2 of this disclosure. In FIG. 12, a calibration device 1200 includes an acquiring unit 1201 which acquires an image captured by the camera 110 installed on a vehicle, an extracting unit 1202 which extracts a point through an image process from the image acquired by the acquiring unit 1201, a calculating unit 1203 which calculates an installation parameter of a camera using coordinates of the point extracted by the extracting unit 1202, and a driving status determining unit 1204 which determines a driving status of the vehicle.

The acquiring unit 1201 acquires an image captured by the camera 110 from the camera 110, in accordance with an externally provided image acquiring signal.

The extracting unit 1202 extracts a feature point from the image and performs an image process to extract corresponding feature points from different images by, for example, block matching.

The calculating unit 1203 calculates an installation parameter of a camera on the basis of the corresponding feature points in different images which are output from the extracting unit 1202.

The driving status determining unit 1204 determines a driving status of the vehicle on the basis of driving distance information, travelling direction information, and motion surface information, which are input from the vehicle. The term "driving distance information" refers to information for determining whether the vehicle moves a certain distance or not. Such information is, for example, provided by a driving distance meter of the vehicle. The term "travelling direction information" refers to information for determining whether the vehicle moves straight or not. Such information is, for example, provided by a steering angle sensor of the vehicle. The term "motion surface information" refers to information for determining whether the motion surface is plane or not. Such information is, for example, provided by an angle sensor, a gyro, or the like of the vehicle.

An operation of the calibration device 1200 having the above-described configuration according to Embodiment 2 of this disclosure will be described with reference to drawings.

Figure 13:
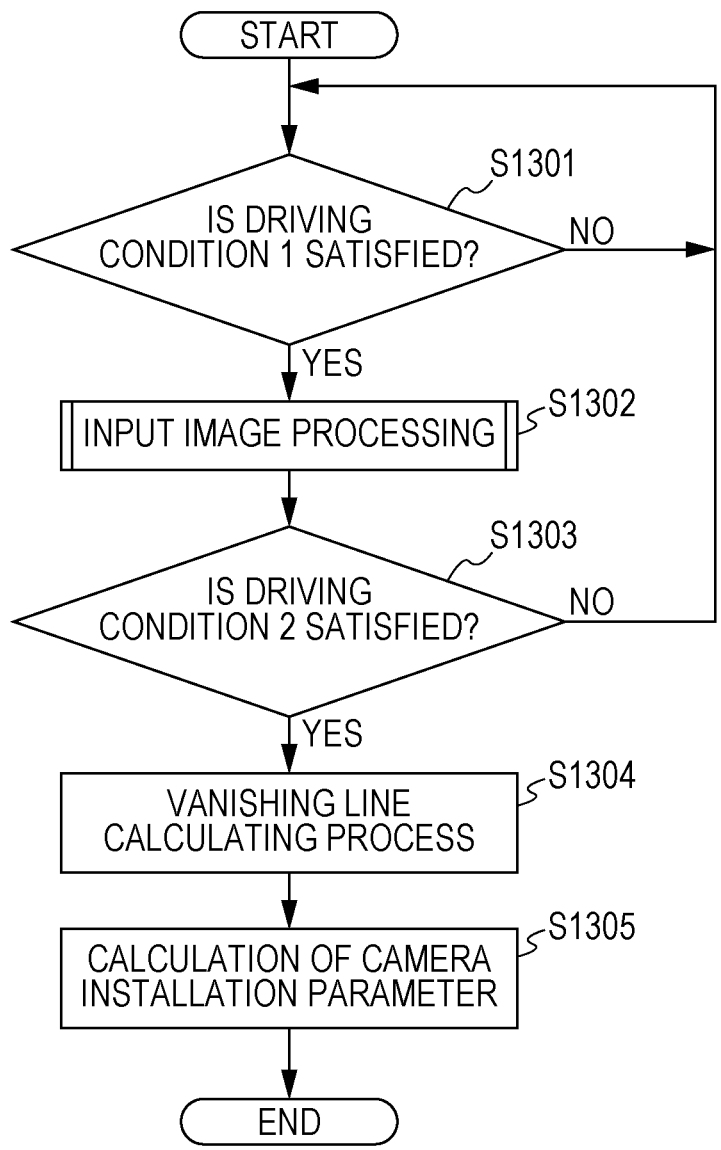
FIG. 13 is a flowchart illustrating an operation example of the calibration device according to Embodiment 2 of this disclosure.

FIG. 13 is a flowchart illustrating an operation of the calibration device 1200 according to Embodiment 2 of this disclosure.

When a process starts, the driving status determining unit 1204 determines whether the status is suitable for executing calibration or not (Step S1301). In other words, the driving status determining unit 1204 determines whether the image which the acquiring unit 1201 acquires from the camera 110 is an image capturing the motion plane or not. Specifically, the driving status determining unit 1204 determines whether a driving condition 1, "the vehicle drives a certain distance, such as 5 meters, and the moving surface information does not change during the drive" is satisfied or not. This determination step is repeated until the driving condition 1 is satisfied. When the driving condition 1 is satisfied, an input image process is then performed (the Step S1302).

Figure 14:
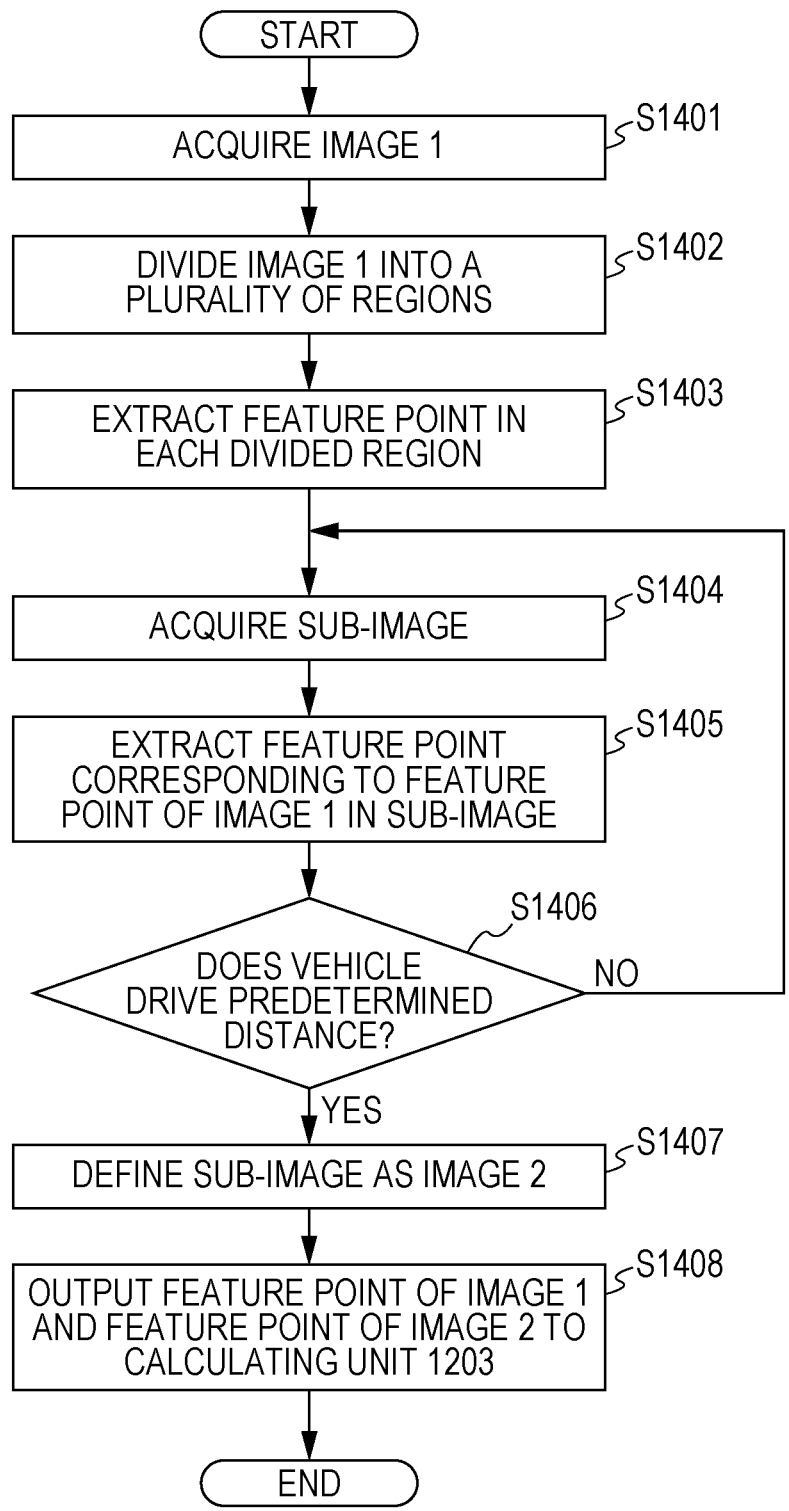
FIG. 14 is a flowchart illustrating a detailed operation example of an input image process of Step S1302 according to Embodiment 2 of this disclosure.

FIG. 14 is a flowchart illustrating details of the input image process of the Step S1302. First, the acquiring unit 1201 acquires a first image (hereinafter, referred to as an image 1) (Step S1401). The image acquired by the acquiring unit 1201 is input to the extracting unit 1202. The extracting unit 1202 divides the image 1 acquired from the acquiring unit 1201 into a plurality of regions (Step S1402).

Then, one feature point is extracted from each of the divided regions through an image process (Step S1403). Specifically, for example, Harris method may be employed and a pixel which has the largest value in each divided region is extracted as a feature point of the region.

Figure 15:
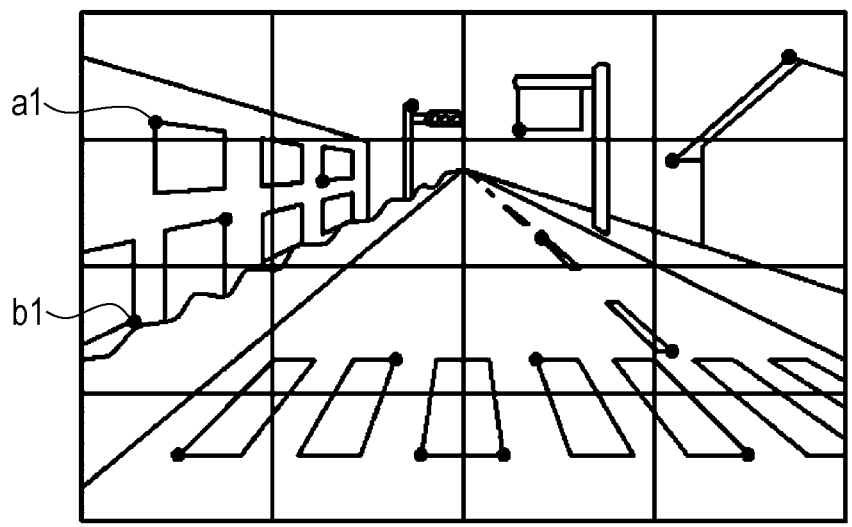
FIG. 15 illustrates an image 1 of the calibration device according to Embodiment 2 of this disclosure.

FIG. 15 illustrates the image 1 where the image is divided into 16 regions and from which 16 feature points are extracted. In the drawing, the feature points are represented by black dots such as the point a1 and the point b1.

Then, until the vehicle drives a predetermined distance, for example, 1 meter, the acquiring unit 1201 acquires at least one image (hereinafter, referred to as a sub-image) from the camera 110 and the extracting unit 1202 performs an image process to extract feature points from the sub-image which correspond to those extracted from the image 1 by, for example, block matching (Step S1404 to Step S1406).

The driving status determining unit 1204 determines whether the vehicle drives the predetermined distance or not. When the vehicle drives the predetermined distance, the extracting unit 1202 defines the last sub-image which is acquired by the acquiring unit 1201, as the image 2 (Step S1407), and outputs the feature points extracted from the image 1 and the feature points extracted from the image 2 to the calculating unit 1203 (Step S1408), whereby the input image process ends.

Figure 16:
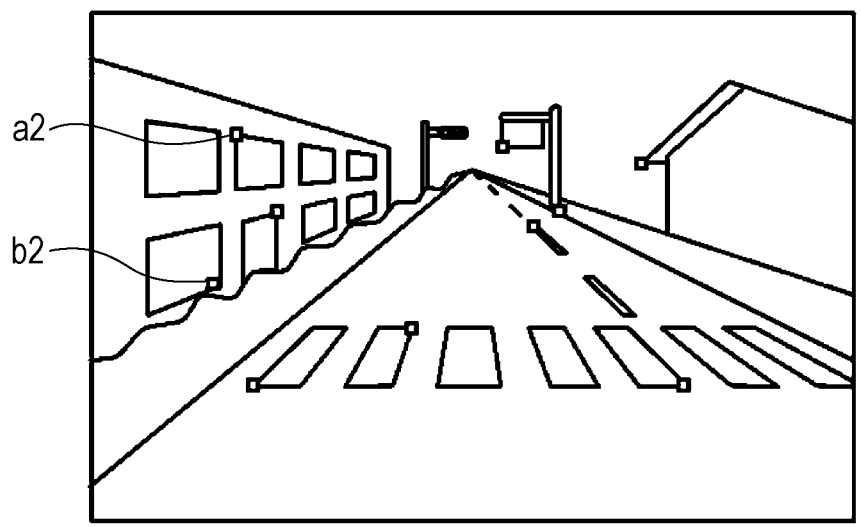
FIG. 16 illustrates an image 2 of the calibration device according to Embodiment 2 of this disclosure.

FIG. 16 illustrates the image 2 obtained through the input image process. White squares in FIG. 16 represent the feature points corresponding to the feature points extracted from the image 1. In FIG. 16, the feature point a2 corresponds to the point a1 in the image 1, and the feature point b2 corresponds to the point b1 in the image 1.

Each one of the feature points in FIG. 16 corresponds to respective feature point in FIG. 15.

After the input image process, the driving status determining unit 1204 determines whether to start a vanishing line calculating process or not (Step S1303). In other words, whether the vehicle moves straight over the motion plane after the driving condition 1 is satisfied or not is determined. Specifically, whether a driving condition 2 "the motion surface information does not change from the value at the time when the driving condition 1 is satisfied and a value of the steering angle sensor shows the vehicle moves straight after the driving condition 1 is satisfied" is satisfied or not is determined.

When the driving condition 2 is not satisfied, the process returns to the determination of whether the driving condition 1 is satisfied or not. When the driving condition 2 is satisfied, the calculating unit 1203 then performs a vanishing line calculating process (Step S1304).

Figure 17:
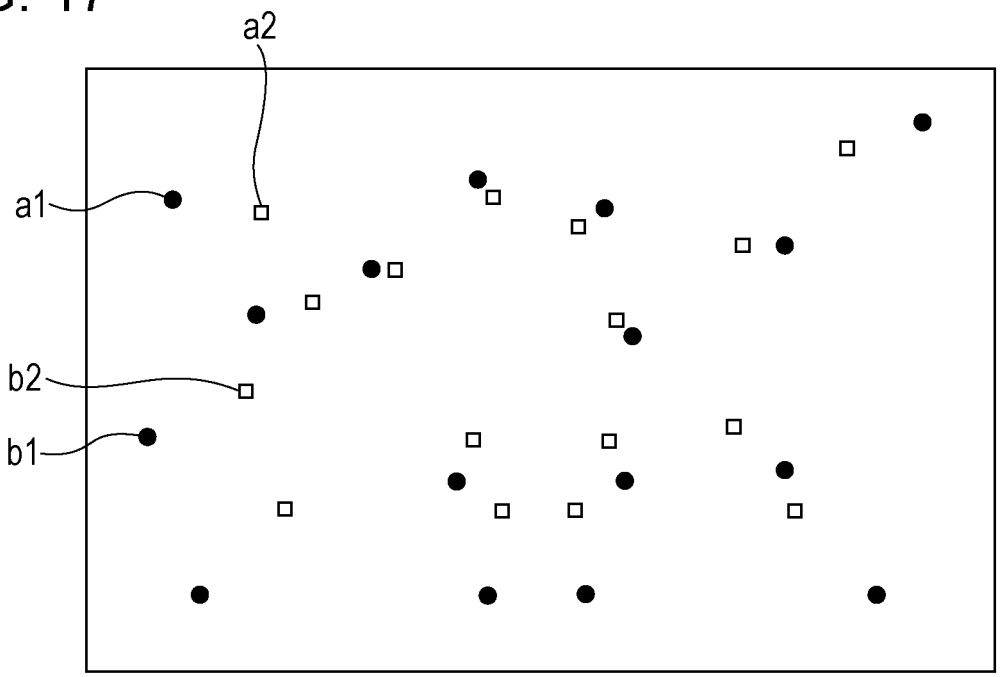
FIG. 17 is a first explanatory diagram illustrating an example of a vanishing line calculating process according to Embodiment 2 of this disclosure.
Figure 18:
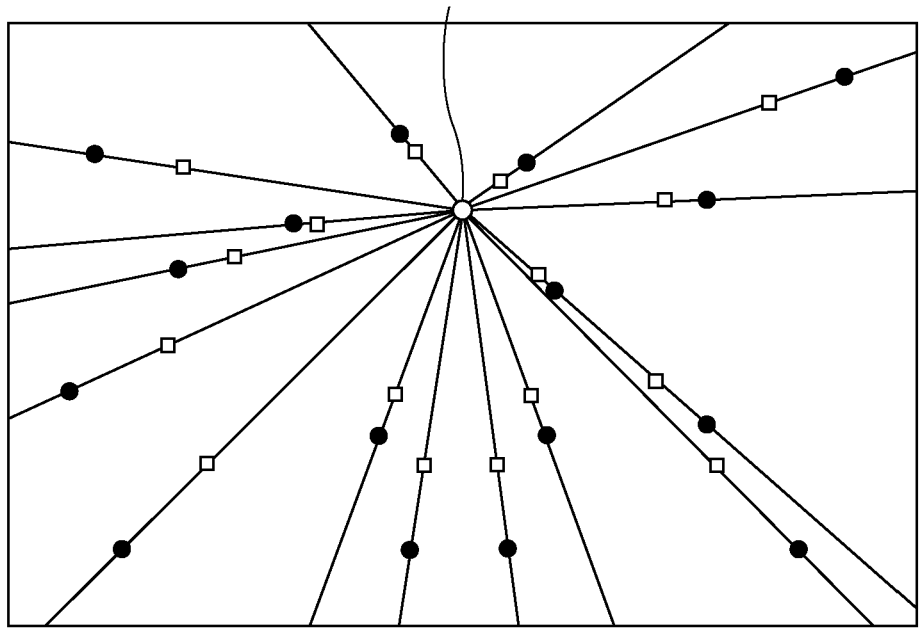
FIG. 18 is a second explanatory diagram illustrating an example of the vanishing line calculating process according to Embodiment 2 of this disclosure.
Figure 19:
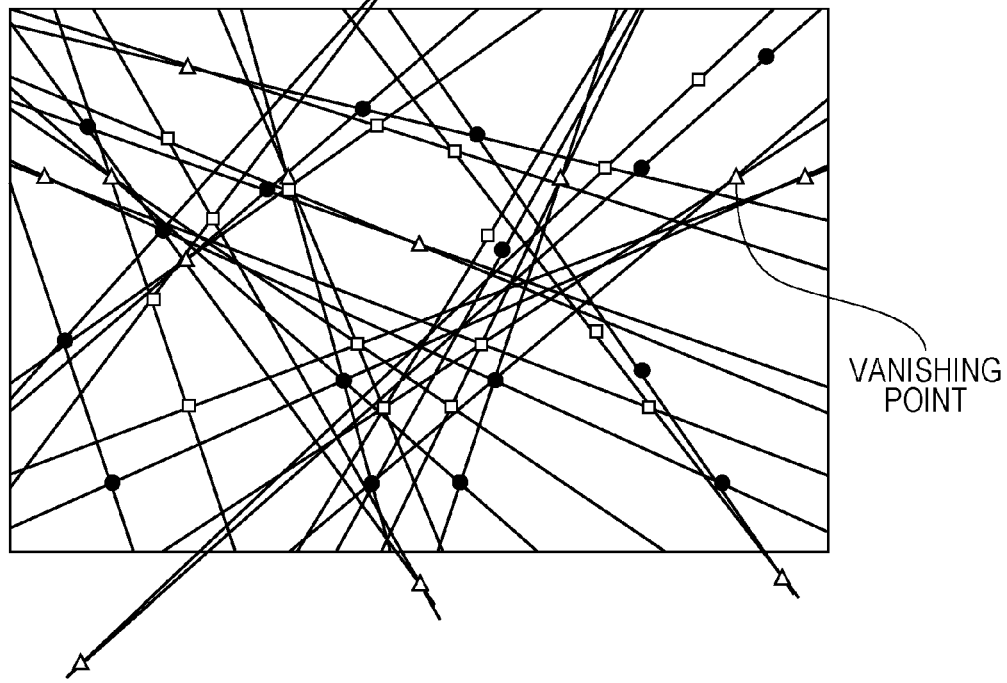
FIG. 19 is a third explanatory diagram illustrating an example of the vanishing line calculating process according to Embodiment 2 of this disclosure.

FIGS. 17, 18, and 19 illustrate an example of the vanishing line calculating process. In FIG. 17, the feature points of the image 1 and the feature points of the image 2 corresponding to the feature points of the image 1 are illustrated in one image.

The calculating unit 1203 calculates straight lines each of which passes through one of the feature points in the image 1 (FIG. 15) and one of the feature points in the image 2 (FIG. 16) corresponding to the one feature point in the image 1 and calculates the intersection of the straight lines as a deep vanishing point. In FIG. 18, a white circle represents the calculated deep vanishing point.

In addition, the calculating unit 1203 selects two feature points in the image 1 and calculates a straight line which passes through the two feature points. The calculating unit 1203 also calculates a straight line which passes through two feature points in the image 2 corresponding to the two feature points selected in the image 1. Then, the calculating unit 1203 calculates the intersection of the straight line calculated in the image 1 and the straight line calculated in the image 2 as a vanishing point. This process is performed for all pairs of the feature points. In FIG. 19, triangles represent the calculated vanishing points.

Then, the calculating unit 1203 calculates a straight line which passes through the deep vanishing point and the largest number of the vanishing points as the vanishing line, using Hough transform.

Figure 20:
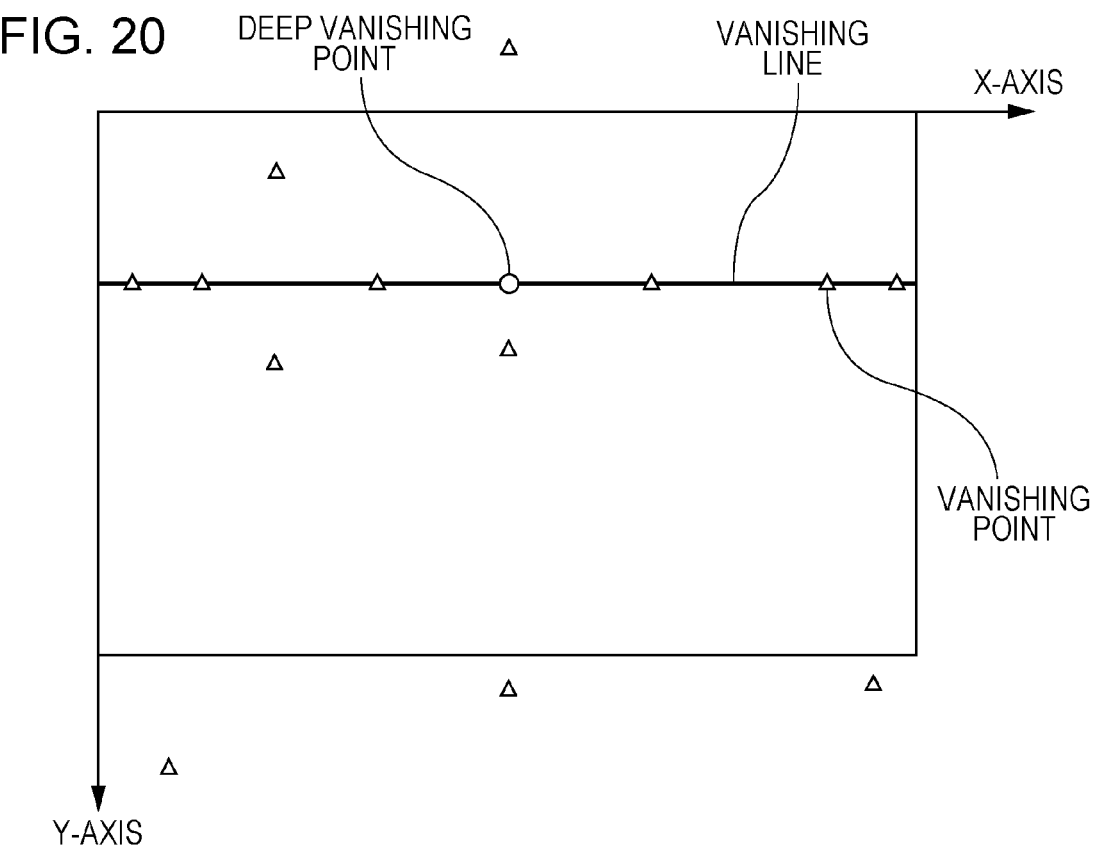
FIG. 20 is an explanatory diagram illustrating an example of a vanishing line according to Embodiment 2 of this disclosure.

FIG. 20 is an explanatory diagram illustrating the calculated deep vanishing point, the calculated vanishing points, and the vanishing line calculated through Hough transform. The vanishing points on the vanishing line in FIG. 20 are calculated from feature points which are on the motion plane or on a plane parallel to the motion plane and which are located in a manner such that the line segment connecting the feature points is not parallel to the moving direction of the vehicle.

The calculating unit 1203 calculates a roll angle, a pitch angle, and a yawing angle, which are camera installation parameters, using the coordinates of the deep vanishing point, the vanishing line, and the focal length of the camera 110, as described in Embodiment 1 (Step S1305).

The calculating unit 1203 calculates an angle between a straight line parallel to the X-axis and the vanishing line calculated in the Step S1304 as a roll angle. Then, the calculating unit 1203 calculates a pitch angle using the focal length of the camera 110, the coordinates of the deep vanishing point, and the roll angle. Finally, the calculating unit 1203 calculates a yawing angle using the focal length of the camera 110, the coordinates of the deep vanishing point, the vanishing line calculated in the Step S1304, and the pitch angle.

Note that in FIG. 12, the driving status determining unit 1204 may calculate the driving distance, the travelling direction, and the levelness of the motion surface on the basis of information from the GPS (global positioning system).

Further, in the block diagram of FIG. 12 illustrating the configuration of the calibration device 1200, the calibration device 1200 may include a CPU (central processing unit), a RAM (random access memory), and a ROM (read only memory) and be realized as a program stored in a CPU-readable storage medium performing processes of the units.

The calculating unit 1203 may calculate the vanishing points only in a part of the image which captures the motion plane.

Further, the calculating unit 1203 illustrated in FIG. 12 may be mounted on the camera to provide a camera having a calibration function.

In general, a large proportion of the image consists of the motion plane; therefore, most of the feature points are extracted from the image of the motion plane. Therefore, the straight line which passes through the deep vanishing point and the largest number of the vanishing points, i.e., the vanishing line can be said to be determined on the basis of the feature points in the motion plane. Accordingly, the calibration device according to Embodiment 2 of this disclosure can calculate a camera installation even when the motion plane in the image is not identified.

This disclosure can be applied to, for example, an on-vehicle camera which is installed on a vehicle and assists driving.

What is claimed is:

1. A calibration device comprising:
an acquirer that acquires an image captured by a camera installed on a movable body;
an extractor that extracts a first point and a second point from the image, the first point and second point are on a motion plane of the movable body or on a plane parallel to the motion plane and a straight line connecting the first point and the second point being not parallel to a moving direction of the movable body; and
a calculator that calculates the installation parameter of the camera on the basis of a positional relationship between a first coordinate of the first point in a first image captured at a first timing and a second coordinate of the second point in the first image, a positional relationship between a third coordinate of the first point in a second image captured at a second timing after the movable body moves in the moving direction after the first timing and a fourth coordinate of the second point in the second image, a positional relationship between the first coordinate and the third coordinate, and a positional relationship between the second coordinate and the fourth coordinate,
wherein at least one of the acquirer, the extractor and the calculator is included in a processor.

2. A camera for a movable body comprising;
the calibration device according to claim 1.

3. A calibration method for a calibration device, the method comprising:
acquiring an image that is captured by the camera installed on a movable body;
extracting a first point and a second point from the image, the first point and the second point being on a motion plane of the movable body or on a plane parallel to the motion plane and a straight line connecting the first point and the second point being not parallel to a moving direction of the movable body; and
calculating the installation parameter of the camera on the basis of a positional relationship between a first coordinate of the first point from a first image that is captured at a first timing and a second coordinate of the second point from the first image, a positional relationship between a third coordinate of the first point from a second image captured at a second timing after the movable body moves in the moving direction after the first timing and a fourth coordinate of the second point from the second image, a positional relationship between the first coordinate and the third coordinate, and a positional relationship between the second coordinate and the fourth coordinate,
wherein at least one of the acquiring, the extracting and the calculating is performed by circuitry.

4. A non-transitory, tangible computer-readable storage medium that stores a program that enables a computer to execute the method according to claim 3.

5. A calibration device for calculating an installation parameter of a camera installed on a movable body, comprising:
an acquirer that acquires a first image and a second image captured by the camera when a movable body moves over a motion plane;
an extractor that extracts a plurality of first feature points from the first image acquired and that extracts a plurality of second feature points corresponding to the plurality of first feature points from the second image; and
a calculator that calculates a first intersection and second intersections, calculates a straight line that passes through the first intersection and a largest number of the second intersections, and calculates an installation parameter of the camera on the basis of the calculated straight line, the first intersection of a plurality of straight lines each of which passes through one of the first feature points and one of the second feature points, the second intersections each of which is an intersection of a first straight line connecting two first feature points selected from the first feature points and a second straight line connecting two second feature points corresponding to the two first feature points,
wherein at least one of the acquirer, the extractor and the calculator is included in a processor.

6. The calibration device according to claim 5, further comprising a driving status determiner that determines a driving status of the movable body,
wherein when the driving status determiner determines that the movable body moves straight a certain distance, the extractor performs an input image process on the image captured by the camera.

7. A camera for a movable body comprising;
the calibration device according to claim 5.

8. A calibration method for a calibration device, the method comprising:
extracting a plurality of first feature points from a first image that is captured by the camera installed on a movable body when a movable body moves over a motion plane;
extracting a plurality of second feature points that correspond to the plurality of first feature points from a second image that is captured by the camera;
calculating a first intersection of a plurality of straight lines each of which passes through one of the first feature points and one of the second feature points corresponding to the one of the first feature points in one image space;
calculating second intersections each of which is an intersection of a first straight line connecting two first feature points selected from the extracted first feature points and a second straight line connecting two second feature points corresponding to the two first feature points;
calculating a straight line that passes through the first intersection and a largest number of the second intersections; and
calculating an installation parameter of the camera on the basis of the calculated straight line,
wherein at least one of the acquiring, the extracting and the calculating is performed by circuitry.

9. A non-transitory, tangible computer-readable storage medium that stores a program that enables a computer to execute the method according to claim 8.

* * * * *